United States Patent
Wiech et al.

(10) Patent No.: US 10,150,362 B2
(45) Date of Patent: Dec. 11, 2018

(54) RADIATOR UNIT FOR A MOTOR VEHICLE

(71) Applicant: GM GLOBAL TECHNOLOGY OPERATIONS LLC, Detroit, MI (US)

(72) Inventors: Thomas Wiech, Ruesselsheim (DE); Ulrich Rein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 15/605,990

(22) Filed: May 26, 2017

(65) Prior Publication Data
US 2017/0341506 A1    Nov. 30, 2017

(30) Foreign Application Priority Data
May 27, 2016  (DE) .................. 10 2016 006 531

(51) Int. Cl.
*B60K 11/08* (2006.01)
*F01P 7/10* (2006.01)
*B60K 11/04* (2006.01)
*F01P 11/10* (2006.01)

(52) U.S. Cl.
CPC ............ *B60K 11/085* (2013.01); *B60K 11/04* (2013.01); *F01P 7/10* (2013.01); *F01P 11/10* (2013.01); *F01P 2060/02* (2013.01); *Y02T 10/88* (2013.01)

(58) Field of Classification Search
CPC ....... B60K 11/085; B60K 11/04; B60K 11/02; B60K 11/08; F01P 2060/02; F01P 7/10; F01P 7/12; F01P 2003/182
USPC .............................................. 62/183; 454/75
See application file for complete search history.

(56) References Cited

U.S. PATENT DOCUMENTS

| | | | |
|---|---|---|---|
| 3,084,715 A | | 4/1963 | Scharres |
| 5,269,264 A | * | 12/1993 | Weinhold ............ B60K 11/085 123/198 E |
| 5,617,608 A | * | 4/1997 | Primlani ............... B60S 1/54 15/250.001 |
| 9,233,605 B2 | | 1/2016 | Hijikata |

(Continued)

FOREIGN PATENT DOCUMENTS

| | | |
|---|---|---|
| DE | 102011006114 A1 | 9/2012 |
| DE | 102013213136 A1 | 1/2015 |

OTHER PUBLICATIONS

German Patent Office, German Search Report for German Application No. 102016006531.1, dated Mar. 20, 2017.

*Primary Examiner* — David J Teitelbaum
*Assistant Examiner* — Mohammad M. Ali
(74) *Attorney, Agent, or Firm* — Lorenz & Kopf, LLP

(57) ABSTRACT

A radiator unit includes a cooling air duct, a first heat exchanger that is arranged in the cooling air duct and incompletely fills out the cross section of the cooling air duct and a second heat exchanger that fills out at least the part of the cross section not filled out by the first heat exchanger. An air flap arrangement meters a cooling air flow through the heat exchangers. A first part of the air flap arrangement predominantly fluidically overlaps the first heat exchanger. A second part of the air flap arrangement predominantly fluidically overlaps the part of the cross section not filled out by the first heat exchanger. The air flaps of the first and second part are coupled for swiveling in opposite directions around axes that are parallel to a boundary between the two parts.

14 Claims, 1 Drawing Sheet

(56) References Cited

U.S. PATENT DOCUMENTS

| | | | |
|---|---|---|---|
| 2001/0054497 A1* | 12/2001 | Kalbacher | B60K 11/08 165/140 |
| 2003/0029581 A1* | 2/2003 | Vide | B60K 11/085 160/201 |
| 2006/0102399 A1* | 5/2006 | Guilfoyle | B60K 11/04 180/68.1 |
| 2006/0211364 A1* | 9/2006 | Brotz | B60K 11/08 454/261 |
| 2008/0283215 A1* | 11/2008 | Saida | B60H 1/00828 165/43 |
| 2010/0282533 A1* | 11/2010 | Sugiyama | B60K 11/085 180/68.1 |
| 2011/0118945 A1 | 5/2011 | Mochizukil | |
| 2011/0240252 A1* | 10/2011 | Borski | F28F 9/002 165/51 |
| 2012/0012410 A1 | 1/2012 | Hori | |
| 2013/0075172 A1 | 3/2013 | Hori | |
| 2013/0337734 A1 | 12/2013 | Knauer | |
| 2015/0167532 A1 | 6/2015 | Kim | |

* cited by examiner

RADIATOR UNIT FOR A MOTOR VEHICLE

CROSS-REFERENCE TO RELATED APPLICATION

This application claims priority to German Patent Application No. 102016006531.1, filed May 27, 2016, which is incorporated herein by reference in its entirety.

TECHNICAL FIELD

The present disclosure pertains to a radiator unit for a motor vehicle, which may include several heat exchangers that serve various purposes since they are designed for various outputs and have various edge lengths.

BACKGROUND

One such radiator unit is disclosed in US 2015-0167532 A1. If the smaller radiator does not completely fill out the cross section of the air duct, it inherently makes sense to mount on a side of the air duct rather than centrally in the air duct.

Air flap arrangements with a plurality of air flaps are known for metering the cooling air flow, which can be swiveled together out of an open position that does not restrict the cooling air flow. The farther away these flaps are deflected from the open position, the more they limit the air flow, but simultaneously divert it to the side. If this side is the one on which the first heat exchanger is mounted, the limited air flow is concentrated thereon, and the limitation predominantly affects the second heat exchanger. Conversely, if it lies opposite the side on which the first heat exchanger is mounted, the air flow through the first heat exchanger is diminished to a significantly greater extent than through the second one. In both cases, the distribution of cooling capacity to the heat exchangers clearly changes as a function of the air flaps.

SUMMARY

In accordance with the present disclosure, cooling air flow is metered and simultaneously minimize depending on the distribution of cooling capacity to the heat exchangers on the flap position in a radiator unit with several heat exchangers, at least one of which incompletely fills out the cross section of a cooling air duct.

In a radiator unit with a cooling air duct and a first heat exchanger that is arranged in the cooling air duct and incompletely fills out the cross section of the cooling air duct and a second heat exchanger that fills out at least the part of the cross section not filled out by the first heat exchanger, and with an air flap arrangement that meters a cooling air flow through the heat exchangers, the present disclosure provides a first part of the air flap arrangement that at least predominantly fluidically overlaps the first heat exchanger, a second part of the air flap arrangement that at least predominantly fluidically overlaps the part of the cross section not filled out by the first heat exchanger. The air flaps of the first and second parts are coupled so that they can swivel in opposite directions around axes that are parallel to a boundary between the two parts. A fluidic overlapping of two objects is here understood to mean that a flow running through the first object subsequently also runs through the second object, without this flow for this purpose having to be separated by a wall or the like from a second flow that bypasses one or both objects.

While the cooling air flow passes the air flap arrangement without being diverted in the open position, and the part of the cooling air flow that runs through the first part of the air flap arrangement flows through the first heat exchanger. The portion of the part of the cooling air flow that flows through the second part of the air flap arrangement is guided by the first heat exchanger when the air flaps are deflected out of the open position. The two parts of the cooling air flow are diverted in opposite directions, i.e., either both toward a boundary between the two parts or both away from this boundary. This does not change the quantitative allocation of the partial air flows to the heat exchangers, so that the ratio between their outputs also remains essentially the same, even if the cooling air flow as a whole is restricted. One boundary between the first and second part of the air flap arrangement preferably aligns with the boundary between the first heat exchanger and the part of the cross section of the cooling air duct not filled out by the first heat exchanger, so as to achieve as precise a conformance between the air flow through the first part of the air flap arrangement and the air flow through the first heat exchanger.

In one preferred embodiment, the boundary between the first and second part is horizontally oriented, or the cross section of the air duct has one short and one long dimension, and the boundary runs between the first and second part in the direction of the long dimension.

In most modern passenger cars, the cross sectional dimension of the air duct in the horizontal is larger than in the vertical, so that the two above formulations are synonymous for such a vehicle. In such a vehicle, the second heat exchanger can be a crossflow radiator, an upper part and a lower part of which carry a coolant flow in respectively opposite directions. It can here make sense for the boundary between the upper and lower part to coincide with a boundary of the first heat exchanger.

If the cross sectional surface of the air flap arrangement and shared cross sectional surface of the first and second heat exchanger vary in size, not all boundaries of the air flap arrangement and heat exchanger can align with each other. In this case, however, at least the first part of the air flap arrangement and the first heat exchanger should border an identical edge of the cooling air duct, and the ratio between the cross sectional surfaces of the first and second part of the air flap arrangement should correspond to the ratio between the cross sectional surfaces of the first heat exchanger and the part of the cross section of the cooling air duct not filled out by the first heat exchanger. If the cross section of the air duct has one short and one long dimension, and swiveling axes of the air flaps extend in the direction of the long dimension, the air flaps should be longitudinally divided by bearings for their stabilization.

In order to accommodate the transmission driving the coupled movement of the air flaps of the first and second part of the air flap arrangement in a space-saving manner, the air flaps of the first and second part can be divided by the latter along the housing. The housing expediently also includes the aforementioned bearings.

The second heat exchanger should completely fill out the cross section of the air duct. To prevent the first heat exchanger from being exposed to not just an air flow already preheated in the second heat exchanger during operation, it should be arranged upstream from the second heat exchanger relative to the cooling air flow.

Since the first heat exchanger does not fill out the cross section of the cooling air duct, a part of the second heat exchanger is not exposed to a cooling air flow preheated by the first heat exchanger even if the first heat exchanger is arranged upstream from the second one. In order to cool the coolant in the second heat exchanger as strongly as possible despite the partial preheating of the cooling air flow, the second heat exchanger should exhibit an upstream and downstream region in relation to the circulation direction of a coolant, and the first heat exchanger should be placed upstream from the upstream region.

In order to minimize the space required by the air flap arrangement independently of the position of its air flaps, the air flaps are preferably designed as butterfly valves.

In order to be able to restrict the cooling air flow virtually to zero, it can be provided that edges of the air flaps contact each other in a closed position of the air flap arrangement. For example, this kind of restriction can be desirable to quickly bring the engine to operating temperature after a cold start, and to quickly bring a catalytic converter up to operating temperature.

The second heat exchanger is preferably an engine radiator; the first heat exchanger can in particular be an intercooler.

BRIEF DESCRIPTION OF THE DRAWINGS

The present disclosure will hereinafter be described in conjunction with the following drawing figures, wherein like numerals denote like elements.

FIG. 1 is a section in the longitudinal direction of the vehicle through a radiator unit according to the present disclosure with an air flap arrangement;

FIG. 2 is a section through the radiator unit on FIG. 1 with the air flap arrangement in a partially closed position;

FIG. 3 is a front view of an air flap arrangement of a radiator unit according to the present disclosure;

FIG. 4 is a section through a radiator unit with the air flap arrangement on FIG. 3 in the open position; and FIG. 5 is the radiator unit from FIG. 4 with closed air flap arrangement.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figures 1, 2, 3, 4, 5:
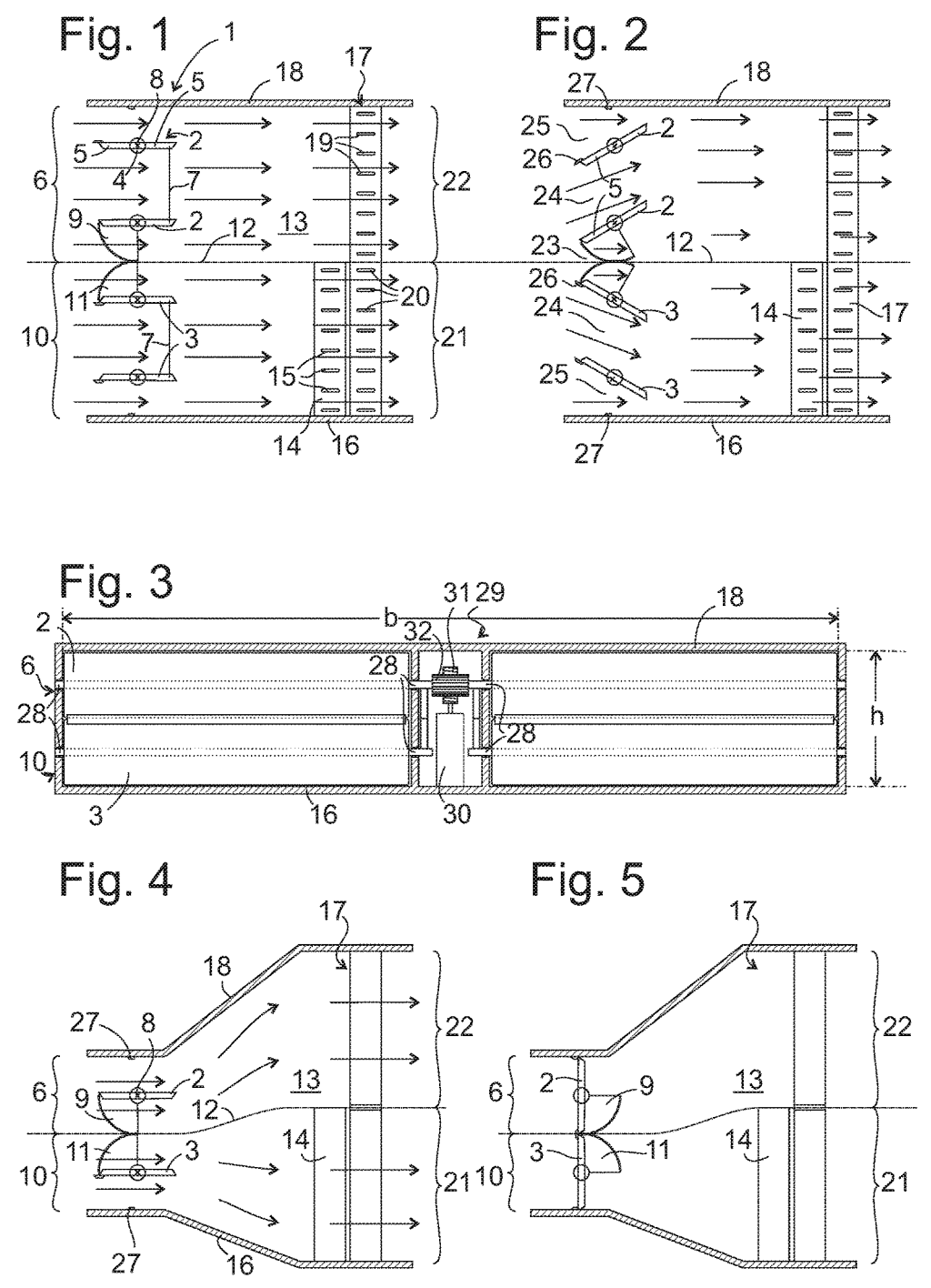

FIG. 1 shows a schematic section of the radiator unit according to the present disclosure. The sectional plane runs in the longitudinal direction of a motor vehicle, into which the radiator unit is integrated. An air flap arrangement 1 that takes up the left part of the figure can be arranged in a front region of the engine compartment of the vehicle, behind a radiator grill not depicted on the figure; however, the air flaps 2, 3 including the air flap arrangement 1 could also themselves be part of the radiator grill, and be visible on the vehicle front.

The air flaps 2, 3 are designed as butterfly valves, with a shaft 4 from which two wings 5 project in two diametrically opposed directions. The air flaps 2 form an upper part 6 of the air flap arrangement 1, are coupled, e.g., by a spoke 7, and can be swiveled counterclockwise out of the open position shown on FIG. 1 around axes 8 perpendicular to the sectional plane into a closed position. A gear or, as shown on the figure, a sector gear 9 is non-rotatably mounted on the shaft 4 of the lower air flap 2. The air flaps 3 include a lower part 10 of the air flap arrangement. The upper air flap 3 of the part 10 is provided with a sector gear 11 that identically mirrors the sector gear 9. The sector gears 9, 11 mesh together at a boundary 12 between the upper and lower parts 6, 10, so that the air flaps 3 rotate in the opposite direction as the air flaps 2, and swivel clockwise, passing into the closed position.

With the cross section remaining constant, a cooling air duct 13 extends from the air flap arrangement to an arrangement of two heat exchangers. The heat exchanger lying upstream relative to the circulation direction of the air in the cooling air duct 13 is an intercooler 14. The intercooler 14 directly adjoins a lower wall 16 of the cooling air duct 13; its pipelines 15 extend parallel to each other, transverse to the sectional plane on FIG. 1, from an inlet water tank on a side wall of the cooling air duct 13 to an outlet water tank on the opposing wall.

An upper edge of the intercooler 14 lies at the height of the here straight, horizontally oriented boundary 12, so that, when the cooling air flows along a straight line through the cooling air duct 13, the portion of cooling air that has passed the lower part 10 of the flap arrangement 1 also runs through the intercooler 14.

An engine radiator 17 is arranged downstream from the intercooler 14 relative to the direction of the cooling air flow. It completely fills out the cross section of the cooling air duct 13 up to the upper wall 18. Just as with the intercooler 14, it is here laid out like a crossflow radiator, with pipelines 19, 20 oriented transverse to the sectional plane, which join two water tanks together at the side edges of the cooling air duct 13. One of these water tanks can here be divided along the boundary 12, and exhibit an inlet and an outlet on respectively different sides of the boundary 12, so that the coolant in the pipelines 19, 20 circulates above or below the boundary in respectively opposite directions. An inlet for the coolant is preferably located in the lower part of the divided water tank, and an outlet in the upper part thereof, so that the pipelines 20 form an upstream region 21 and the pipelines 19 form a downstream region 22 of the engine radiator 17 relative to the circulation direction of the coolant.

FIG. 2 shows the same radiator unit with the air flap arrangement 1 in a partially closed position. The air flaps 2, 3 are here swiveled around the axes 8 by a respective 30° relative to their position depicted on FIG. 1. The free cross section of a passage 23 between the air flaps 2, 3 directly adjacent to the boundary 12 is thereby halved, and the flow through the radiators 14, 17 downstream from the passage 23 is correspondingly also diminished. The cross section of passages 25 between the upper flap 2 and upper wall 18 or between the lower flap 3 and lower wall 16 is also halved. In passages 24 between air flaps 2 or 3 swiveled in the same direction, the reduction in passage cross section is less than in the passages 23, 25, but a diversion of the air flow helps to reduce the throughput. The air flow through the radiators 14, 17 is thus respectively shifted from the boundary 12 toward the walls 16, 18, but the relative reduction is essentially the same for both radiators 14, 17.

The air flaps 2, 3 can be swiveled by a total of 90° until reaching a completely closed position, in which they lie in an identical plane that runs through their swiveling axes 8. A respective one of the facing wings 5 of adjacent air flaps 2 or 3 carries a flange 26 elongated transverse to the sectional plane, which tightly contacts the adjacent wing 5 in the completely closed position. The upper and lower walls 18, 16 exhibit webs 27 elongated transverse to the sectional plane, against which a respective wing 5 also abuts tightly in the completely closed position.

In order to reduce their wind resistance and protect pedestrians, most motor vehicles have a forwardly sloping hood, which limits the height available for the cooling air duct 13, at least in proximity to the radiator grill. FIG. 3 presents a front view of an air flap arrangement 1 with a reduced overall height h. The upper and lower parts 6, 10 of the air flap arrangement 1 here each encompass only a single air flap 2 or 3. The width b of the air flap arrangement 1 can measure a multiple of the height h. To prevent the air flaps 2, 3 from being made to vibrate by the air flow enveloping them while driving, they are divided in the direction of width b, and held in bearings 28 both at their ends and in the middle.

The middle bearings 28 are here simultaneously side walls of a housing 29, which accommodates the intermeshing sector gears 9, 11 and a transmission that drives the swiveling movement of the air flaps 2, 3. Shown as an example on FIG. 3 is a transmission with an electric motor 30, a worm 31 mounted on a drive shaft of the electric motor 30, and a gear 32 that meshes with the worm 31 on one of the shafts 4; other transmission forms are also possible. The shaft 4 of the air flap 2 can extend continuously through the housing, or consist of two parts rigidly assembled in the housing 29. The shaft 4 of the air flap 3 is here interrupted to create space for the transmission; instead, two pairs of intermeshing sector gears 9, 11 are provided to separately couple each half of the air flap 3 to the air flap 2.

The progression of the hood rising toward the back from the radiator grill makes it possible to give the air duct 13 a greater height h' in the environment of the radiators 14, 17 than on the air flap arrangement 1, and thereby distribute the cooling air volume flow more uniformly to the radiators 14, 17. Accordingly, the height of the boundary 12 between the portion of the cooling air flow that passed the upper part 6 of the air flap arrangement 1 and the portion that passed the lower part 10 can vertically displace along the air duct 13. In order for the portion of the cooling air flow that passed the lower part 10 to essentially completely hit the intercooler 14 or for the portion of the cooling air flow that passed the upper part 6 to be guided essentially completely by the intercooler 14 on the downstream part 22 of the engine radiator 17, the cross sectional ratio between the entire air flap arrangement 1 and its lower part 10 is exactly as large as the one between the overall cross section of the air duct 13 at the height of the radiators 14, 17 and the cross section of the intercooler 14.

In the illustration on FIG. 5, the air flap arrangement 1 is in the completely closed position. The air flow through the radiators 14, 17 is interrupted. The air flaps 2, 3 lie in an identical plane running through their swiveling axes; a flange 26 of the air flap 3 covers an edge of the air flap 2 facing the boundary 12; edges of both air flaps 2, 3 facing away from the boundary 12 overlap with webs 27 of the upper and lower wall 18, 16.

The walls 16, 18 need not, as appears to be the case on FIGS. 4, 5, extend continuously from the air flap arrangement 1 up to the radiators 14, 17, but rather can also exhibit stages or interruptions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A radiator unit comprising:
   an air duct having a cross section;
   a first heat exchanger arranged in the cooling air duct and filling a first air duct portion of the air duct cross section;
   a second heat exchanger arranged in the cooling duct and filling out a second air duct portion of the air duct cross section including at least a portion of the air duct cross section not filled out by the first heat exchanger; and
   an air flap arrangement for metering a cooling airflow through the heat exchangers, the air flap arrangement including:
      a first air flap at least predominantly fluidically overlaps the first air duct portion and operably to swivel about a first axis between an open position and a closed position; and
      a second air flap at least predominantly fluidically overlaps the second air duct portion and operable to swivel about a second axis between an open position and a closed position, wherein the second axis is parallel to the first axis;
      wherein the first and second air flaps are coupled to swivel in opposite directions around first and second axes respectively and the first and second axes are parallel to a boundary between the first and second air flap.

2. The radiator unit according to claim 1, wherein the boundary between the first and second air flaps aligns with a boundary between the first heat exchanger and a part of the cross section of the cooling air duct not filled by the first heat exchanger.

3. The radiator unit according to claim 2, wherein the first air flap and the first heat exchanger border a common edge of the cooling air duct, and a ratio between the cross sectional surfaces of the first and second air flaps corresponds to a ratio between a cross sectional surfaces of the first heat exchanger and the part of the cross section of the cooling air duct not filled out by the first heat exchanger.

4. The radiator unit according to claim 3, wherein the boundary between the first and second air flaps is horizontally oriented.

5. The radiator unit according claim 1, wherein the cross section of the cooling air duct has a short dimension and a long dimension, and the boundary runs between the first and second air flaps in the direction of the long dimension.

6. The radiator unit according to claim 1, wherein the cross section of the cooling air duct has a short dimension and a long dimension, and the first and second axes extend in a direction of the long dimension, and the air flaps are longitudinally divided by a bearing.

7. The radiator unit according to claim 1, wherein the first and second air flaps are longitudinally divided by a shared housing of a transmission that controls the position of the first and second flaps.

8. The radiator unit according to claim 1, wherein the second heat exchanger completely fills out the cross section of the air duct.

9. The radiator unit according to claim 1, wherein the first heat exchanger is arranged in the air duct upstream of the second heat exchanger relative to a coolant flow direction.

10. The radiator unit according to claim 9, wherein the second heat exchanger comprises an upstream region and a downstream region relative to the coolant flor direction, wherein the first heat exchanger is positioned upstream of the upstream region.

11. The radiator unit according to claim 1, wherein the first and second air flaps comprises butterfly valve assemblies.

12. The radiator unit according to claim 1, wherein an edge of the first air flap contacts an edge of the second air flap in the closed position of the air flap arrangement.

13. The radiator unit according to claim 1, wherein the second heat exchanger comprises an engine radiator.

14. The radiator unit according to claim 13, wherein the first heat exchanger comprises an intercooler.

* * * * *